US011657623B2

(12) United States Patent
Seo

(10) Patent No.: US 11,657,623 B2
(45) Date of Patent: *May 23, 2023

(54) TRAFFIC INFORMATION PROVIDING METHOD AND DEVICE, AND COMPUTER PROGRAM STORED IN MEDIUM IN ORDER TO EXECUTE METHOD

(71) Applicant: HANWHA TECHWIN CO., LTD., Seongnam-si (KR)

(72) Inventor: Yeonsik Seo, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,921

(22) Filed: Aug. 11, 2022

(65) Prior Publication Data
US 2022/0392233 A1 Dec. 8, 2022

Related U.S. Application Data

(63) Continuation of application No. 16/648,667, filed as application No. PCT/KR2017/012462 on Nov. 6, 2017, now Pat. No. 11,436,841.

(51) Int. Cl.
*H04N 7/18* (2006.01)
*G06V 20/58* (2022.01)
(Continued)

(52) U.S. Cl.
CPC .......... *G06V 20/584* (2022.01); *G06F 16/434* (2019.01); *G06Q 50/26* (2013.01); *G06Q 50/30* (2013.01); *G06V 20/54* (2022.01)

(58) Field of Classification Search
USPC ...................................................... 348/148
See application file for complete search history.

(56) References Cited

U.S. PATENT DOCUMENTS 5,568,406 A * 10/1996 Gerber .................. G07B 15/04
702/170
8,995,721 B1 3/2015 Fairfield et al.
(Continued)

FOREIGN PATENT DOCUMENTS

KR 10-2011-0037486 4/2011
KR 10-1205365 11/2012
(Continued)

OTHER PUBLICATIONS

International Search Report dated Feb. 27, 2018, issued in International Patent Application No. PCT/KR2017/012462.

*Primary Examiner* — Nigar Chowdhury
(74) *Attorney, Agent, or Firm* — Sughrue Mion, PLLC

(57) ABSTRACT

An object tracking method using traffic information, includes the steps of: receiving a travel route request for a first vehicle from a terminal; and allowing a database, in which a record for each of a plurality of frames included in images captured by a plurality of cameras for photographing traffic information is stored and includes an object tag and an event tag recognized in each frame, to provide, while searching for the record in chronological order, route information including photographing position information and/or images corresponding to a continuous first record section including an object tag corresponding to first vehicle information, a second record including an object tag and a stopover event tag corresponding to the first vehicle information, and a continuous third record section, which is continuous to the second record and includes an object tag corresponding to first person information included in the stopover event tag of the second record.

12 Claims, 10 Drawing Sheets

(51) Int. Cl.
  *G06F 16/432* (2019.01)
  *G06Q 50/26* (2012.01)
  *G06Q 50/30* (2012.01)
  *G06V 20/54* (2022.01)

(56) References Cited

U.S. PATENT DOCUMENTS

| | | | |
|---|---|---|---|
| 9,087,297 B1 | 7/2015 | Filippova et al. | |
| 9,210,336 B2 | 12/2015 | Scanlon et al. | |
| 9,646,210 B2 | 5/2017 | Nye | |
| 10,134,286 B1 | 11/2018 | Elswick et al. | |
| 10,691,958 B1 | 6/2020 | Fink et al. | |
| 11,151,192 B1 | 10/2021 | Campbell | |
| 11,244,171 B2 | 2/2022 | Wu et al. | |
| 11,250,054 B1 | 2/2022 | Campbell | |
| 2001/0056544 A1* | 12/2001 | Walker | B60W 50/029 180/170 |
| 2004/0199785 A1* | 10/2004 | Pederson | G08B 13/19663 340/293 |
| 2005/0046584 A1* | 3/2005 | Breed | B60R 21/01536 340/13.31 |
| 2006/0026017 A1* | 2/2006 | Walker | H04L 63/302 701/31.4 |
| 2006/0206246 A1* | 9/2006 | Walker | H04L 63/302 701/16 |
| 2014/0324864 A1 | 10/2014 | Choe et al. | |
| 2014/0362230 A1 | 12/2014 | Bulan et al. | |
| 2015/0124099 A1 | 5/2015 | Evanitsky et al. | |
| 2015/0161541 A1 | 6/2015 | Brennan et al. | |
| 2015/0243165 A1 | 8/2015 | Elsheemy | |
| 2015/0312400 A1 | 10/2015 | Hansen | |
| 2016/0078758 A1* | 3/2016 | Basalamah | G08G 1/0141 701/118 |
| 2016/0078759 A1* | 3/2016 | Nerayoff | G08G 1/0175 701/3 |
| 2016/0087933 A1* | 3/2016 | Johnson | H04W 12/35 709/245 |
| 2016/0098929 A1 | 4/2016 | Nakhjavani | |
| 2016/0343252 A1 | 11/2016 | Davies et al. | |
| 2017/0034470 A1 | 2/2017 | Kleinrock et al. | |
| 2017/0053169 A1 | 2/2017 | Cuban et al. | |
| 2017/0075888 A1 | 3/2017 | Ekin | |
| 2017/0076597 A1 | 3/2017 | Beattie, Jr. et al. | |
| 2017/0200197 A1 | 7/2017 | Brubaker | |
| 2017/0243479 A1 | 8/2017 | Hill | |
| 2017/0263122 A1 | 9/2017 | Kamajaya et al. | |
| 2017/0308800 A1 | 10/2017 | Cichon et al. | |
| 2017/0318360 A1 | 11/2017 | Tran et al. | |
| 2017/0323540 A1 | 11/2017 | Boykin | |
| 2017/0337813 A1 | 11/2017 | Taylor | |
| 2018/0018869 A1 | 1/2018 | Ahmad et al. | |
| 2018/0025235 A1 | 1/2018 | Friedman | |
| 2018/0025636 A1 | 1/2018 | Boykin et al. | |
| 2018/0060789 A1 | 3/2018 | Stefik et al. | |
| 2018/0100748 A1 | 4/2018 | Waniguchi et al. | |
| 2018/0150764 A1 | 5/2018 | Stenneth | |
| 2018/0268238 A1 | 9/2018 | Khan et al. | |
| 2020/0317216 A1 | 10/2020 | Konrardy et al. | |
| 2020/0335134 A1 | 10/2020 | Gonzalez-Banos et al. | |
| 2022/0033077 A1 | 2/2022 | Myslinski | |

FOREIGN PATENT DOCUMENTS

| | | |
|---|---|---|
| KR | 10-1365762 | 3/2014 |
| KR | 10-1368831 | 3/2014 |
| KR | 10-1460781 | 11/2014 |
| KR | 10-1470315 | 12/2014 |
| KR | 10-1621822 | 5/2016 |

* cited by examiner

FIG. 3

| CHANNEL NO. | TIME | PERSON | VEHICLE | EVENT |
|---|---|---|---|---|
| 1 | 01:01:01 | A | | |
| 1 | 01:01:02 | A | B | |
| 1 | 01:01:03 | | B | |
| ... | | | | |
| 2 | 01:05:01 | | B | |
| 2 | 01:05:02 | A | B | |
| 2 | 01:05:03 | A | | |
| ... | | | | |

FIG. 4

| CHANNEL NO. | TIME | PERSON | VEHICLE | EVENT |
|---|---|---|---|---|
| 1 | 01:01:01 | A | | |
| 1 | 01:01:02 | A | B | |
| 1 | 01:01:03 | | B | GETTING-IN |
| ... | | | | |
| 2 | 01:05:01 | | B | |
| 2 | 01:05:02 | A | B | GETTING-OFF |
| 2 | 01:05:03 | A | | |
| ... | | | | |

FIG. 7

| | CHANNEL NO. | TIME | PERSON | VEHICLE | EVENT |
|---|---|---|---|---|---|
| 71 — | 1 | 01:01:01 | A | | |
| 72 — | 1 | 01:01:02 | A | B | |
| 73 — | 1 | 01:01:03 | | B | GETTING-IN |
| 74 — | 1 | 01:01:04 | | B | |
| 75 — | 1 | 01:01:05 | | B | |
| 76 — | 1 | 01:01:06 | C | B | |
| 77 — | 1 | 01:01:07 | C | B | |
| | ... | | | | |

FIG. 8

| | CHANNEL NO. | TIME | PERSON | VEHICLE | EVENT |
|---|---|---|---|---|---|
| 81 | 2 | 01:05:01 | | B | |
| 82 | 2 | 01:05:02 | A | B | GETTING-OFF |
| 83 | 2 | 01:05:03 | A | | |
| 84 | 2 | 01:05:04 | A | | |
| 85 | 2 | 01:05:05 | A | | |
| 86 | 2 | 01:05:06 | A | D | |
| 87 | 2 | 01:05:07 | A | D | |
| | ... | | | | |

TRAFFIC INFORMATION PROVIDING METHOD AND DEVICE, AND COMPUTER PROGRAM STORED IN MEDIUM IN ORDER TO EXECUTE METHOD

CROSS-REFERENCE TO RELATED APPLICATIONS

This is a Continuation of U.S. application Ser. No. 16/648,667 filed Mar. 19, 2020, which is a National Stage Entry of International Patent Application No. PCT/KR2017/012462, filed on Nov. 6, 2017, and claims priority from and the benefit of Korean Patent Application No. 10-2017-0140812, filed on Oct. 27, 2017, each of which is hereby incorporated by reference for all purposes as if fully set forth herein.

BACKGROUND

Field

Exemplary embodiments of the invention relate to a traffic information providing method and apparatus, and a computer program stored in a medium to execute the method.

Discussion of the Background

Closed-circuit televisions (CCTVs) have been installed in many zones, such as the express ways, general roads, and residential areas, to be used to find criminals, suspects, and vehicles involved in crimes in case of need. A method of recording video to look for a person or vehicle from the recorded video as necessary has been primarily used. However, because there is no information about the correlation between objects, it is difficult to track objects although vehicle recognition, face recognition and other various image analysis algorithms, etc., are used.

SUMMARY

Provided are a traffic information providing method and apparatus for providing an object tracking service of associating information about vehicles with information about persons, and a computer program stored in a medium to execute the method. Also, provided is a traffic information processing method of establishing a database capable of associating information about vehicles with information about persons.

Also, provided are a computer program for providing the method, and a computer-readable recording medium storing the computer program. It should be noted that technical objects of the present embodiments are not limited to the above-described technical objects, and other technical objects will be apparent to those skilled in the art from the following embodiments.

An embodiment of the disclosure provides an object tracking method using traffic information, including: receiving a request for a travel route of a first vehicle from a terminal; and searching for a record in chronological order in a database storing a plurality of records respectively for a plurality of frames included in images captured by a plurality of cameras photographing traffic information, each record including an object tag and an event tag recognized from a frame, and providing route information including at least one of an image and photographing location information corresponding to a continuous first record section including an object tag corresponding to information about the first vehicle, a second record including a getting-off event tag and the object tag corresponding to the information about the first vehicle, and a continuous third record section following the second record and including an object tag corresponding to information about a first person included in the getting-off event tag of the second record.

The method may further include: an object tag generating operation of recognizing at least one of a person and a vehicle from a frame included in the images captured by the plurality of cameras photographing the traffic information, and generating an object tag for the frame; and an event tag generating operation of referring to the object tag, and when a vehicle and a person within a predetermined distance from the vehicle are recognized from a first frame, and the vehicle is recognized while the person is not recognized from a second frame following the first frame, generating a getting-in event tag including information about the vehicle and information about the person for the second frame, or when a vehicle is recognized while no person is recognized from a third frame and the vehicle and a person within the predetermined distance from the vehicle are recognized from a fourth frame following the third frame, generating a getting-off event tag including information about the vehicle and information about the person for the fourth frame.

The object tag generating operation includes sampling the image into a plurality of sampled frames at an interval N of N frames, determining whether at least one of a person and a vehicle is present for each of the plurality of sampled frames, and generating a plurality of object tags for the plurality of frames, respectively, according to the determined result, and the event tag generating operation includes generating a tag of at least one of a getting-in event and a getting-off event with reference to the plurality of object tags generated for the plurality of sampled frames, wherein the first frame and the second frame are successive in the plurality of sampled frames, and the third frame and the fourth frame are successive in the plurality of sampled frames.

The object tag generating operation may include including an object tag recognized from each frame of the plurality of frames included in the images in a record for the frame, and storing the record in the database, and the event tag generating operation may include generating the event tag with reference to the object tag of the record, and storing the event tag in a record of a frame corresponding to the event tag.

The event tag generating operation may include, when the vehicle and the person within the predetermined distance from the vehicle are recognized from the first frame, the vehicle is recognized while the person is not recognized from the second frame following the first frame, and the person is not recognized from m frames after the second frame, generating the getting-in event tag including the information about the vehicle and the information about the person for the second frame.

The event tag generating operation may include, when the vehicle and the person within the predetermined distance from the vehicle are recognized from the first frame, the vehicle is recognized while the person is not recognized from the second frame following the first frame, and the person is not recognized from m frames after a photographing time of the second frame photographed by an adjacent camera of a camera that has photographed the second frame, generating the getting-in event tag including the information about the vehicle and the information about the person for the second frame.

Another embodiment of the disclosure provides an object tracking method using traffic information, including: receiving a request for a travel route of a first person from a terminal; and searching for a record in chronological order in a database storing a plurality of records respectively for a plurality of frames included in images captured by a plurality of cameras photographing traffic information, each record including an object tag and an event tag recognized from a frame, and providing route information including at least one of an image and photographing location information corresponding to a continuous first record section including an object tag corresponding to information about the first person, a second record including a getting-in event tag and the object tag corresponding to the information about the first person, and a continuous third record section following the second record and including an object tag corresponding to second vehicle information included in the getting-in event tag of the second record.

Another embodiment of the disclosure provides a computer program stored in a medium to execute at least one method described above by using a computer.

Another embodiment of the disclosure provides an object tracking apparatus using traffic information, including: a communicator configured to receive a request for a travel route of a first vehicle from a terminal; and a route provider configured to search for a record in chronological order in a database storing a plurality of records respectively for a plurality of frames included in images captured by a plurality of cameras photographing traffic information, each record including an object tag and an event tag recognized from a frame, and provide route information including at least one of an image and photographing location information corresponding to a continuous first record section including an object tag corresponding to information about the first vehicle, a second record including a getting-off event tag and the object tag corresponding to the information about the first vehicle, and a continuous third record section following the second record and including an object tag corresponding to information about a first person included in the getting-off event tag of the second record.

The object tracking apparatus may further include: an object recognizer configured to recognize at least one of a person and a vehicle from a frame included in the images captured by the plurality of cameras photographing the traffic information, and generate an object tag for the frame; and an event recognizer configured to refer to the object tag, and when a vehicle and a person within a predetermined distance from the vehicle are recognized from a first frame and the vehicle is recognized while the person is not recognized from a second frame following the first frame, generate a getting-in event tag including information about the vehicle and information about the person for the second frame, or when a vehicle is recognized while no person is recognized from a third frame and the vehicle and a person within the predetermined distance from the vehicle are recognized from a fourth frame following the third frame, generate a getting-off event tag including the information about the vehicle and the information about the person for the fourth frame.

The object recognizer may be further configured to sample the image into a plurality of sampled frames at an interval N of N frames, determine whether at least one of a person and a vehicle is present for each of the plurality of sampled frames, and generate a plurality of object tags for the plurality of frames, respectively, according to the determined result, and the event recognizer may be further configured to generate a tag of at least one of a getting-in event and a getting-off event with reference to the plurality of object tags generated for the plurality of sampled frames, wherein the first frame and the second frame are successive in the plurality of sampled frames, and the third frame and the fourth frame are successive in the plurality of sampled frames.

The object recognizer may be further configured to include an object tag recognized from each frame of the plurality of frames included in the image in a record for the frame, and store the record in the database, and the event recognizer may be further configured to generate the event tag with reference to the object tag of the record, and store the event tag in a record of a frame corresponding to the event tag.

The event recognizer may be further configured to, when the vehicle and the person within the predetermined distance from the vehicle are recognized from the first frame, the vehicle is recognized while the person is not recognized from the second frame following the first frame, and the person is not recognized from m frames after the second frame, generate the getting-in event tag including the information about the vehicle and the information about the person for the second frame.

The event recognizer may be further configured to, when the vehicle and the person within the predetermined distance from the vehicle are recognized from the first frame, the vehicle is recognized while the person is not recognized from the second frame following the first frame, and the person is not recognized from m frames after a photographing time of the second frame photographed by an adjacent camera of a camera that has photographed the second frame, generate the getting-in event tag including the information about the vehicle and the information about the person for the second frame.

Another embodiment of the disclosure provides an object tracking apparatus using traffic information, including: a communicator configured to receive a request for a travel route of a first person from a terminal; and a route provider configured to search for a record in chronological order in a database storing a plurality of records respectively for a plurality of frames included in images captured by a plurality of cameras photographing traffic information, each record including an object tag and an event tag recognized from a frame, and provide route information including at least one of an image and photographing location information corresponding to a continuous first record section including an object tag corresponding to information about the first person, a second record including a getting-in event tag and the object tag corresponding to the information about the first person, and a continuous third record section following the second record and including an object tag corresponding to second vehicle information included in the getting-in event tag of the second record.

According to an embodiment of the disclosure, because a database capable of associating information about vehicles with information about persons is established, and a tracking function of associating information about vehicles with information about persons is provided by using the established database, it is possible to track a suspect or a suspected vehicle while keeping sight of the suspect or the suspected vehicle even when a person makes a getaway after getting in a vehicle or after getting off a vehicle.

BRIEF DESCRIPTION OF DRAWINGS

FIG. 3 shows an example of a table stored in a database according to an embodiment of the disclosure.

FIG. 4 shows another example of a table stored in a database according to an embodiment of the disclosure.

FIG. 7 shows another example of a table stored in a database, according to an embodiment of the disclosure.

FIG. 8 shows another example of a table stored in a database, according to an embodiment of the disclosure.

DETAILED DESCRIPTION

Figure 1:
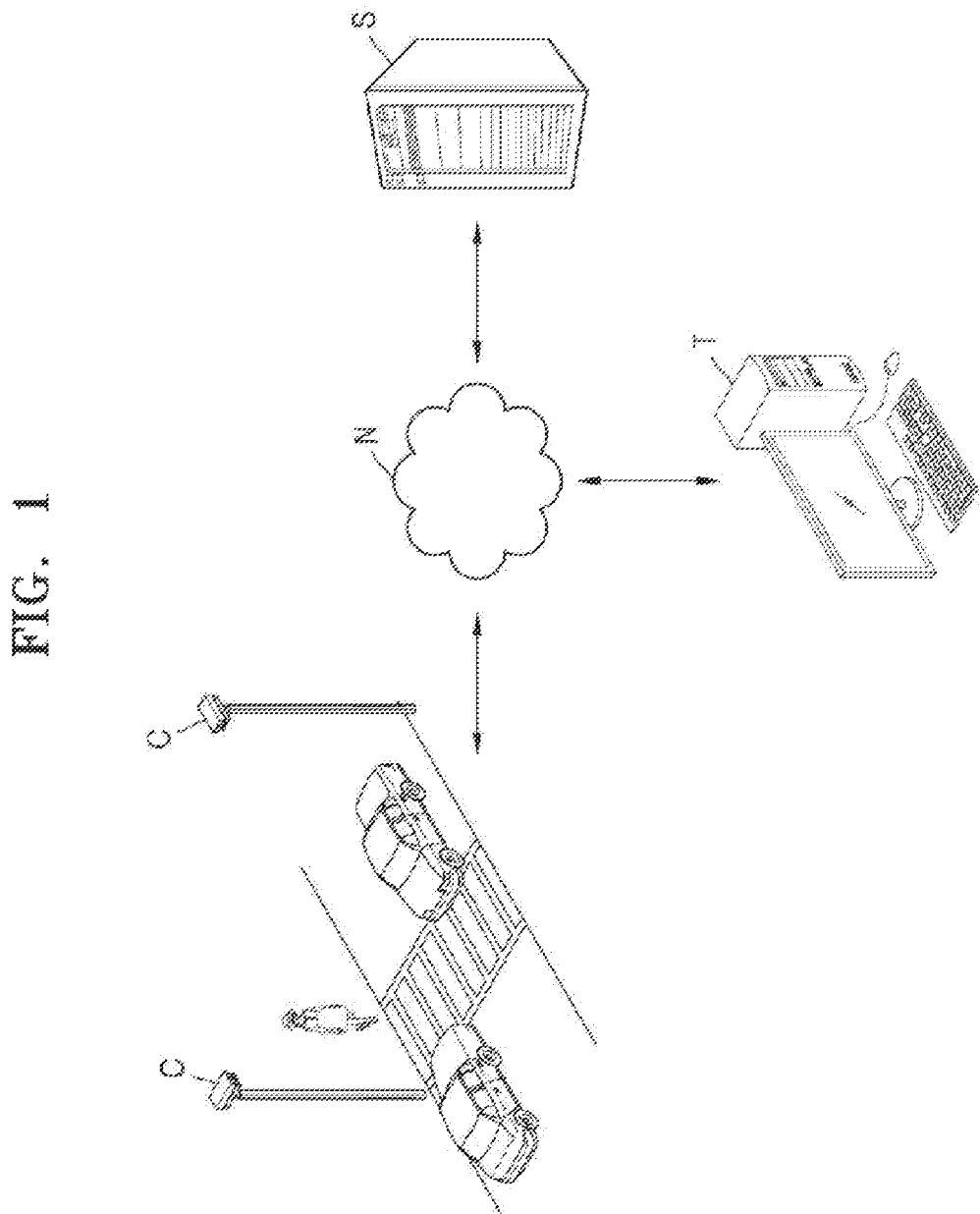
FIG. 1 shows a system according to an embodiment of the disclosure.

The disclosure can have various modifications and various embodiments, and specific embodiments are shown in the drawings and described in the detailed description, although the disclosure is not limited to the specific embodiments. That is, it has to be understood that the disclosure includes all modifications, equivalents, and substitutes included in the concept and technical scope of the disclosure. In the following description, if it is determined that detailed descriptions for related art make the subject matter of the disclosure obscure unnecessarily, the detailed descriptions will be omitted.

It will be understood that, although the terms "first", "second", etc. may be used herein to describe various components, these components should not be limited by these terms These terms are only used to distinguish one component from another.

The terms used in the present specification are used to describe the specific embodiments, not for the purpose of limiting the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

Hereinafter, the disclosure will be described in detail with reference to embodiments of the disclosure shown in the accompanying drawings.

FIG. 1 shows a system according to an embodiment of the disclosure.

Referring to FIG. 1, a system according to an embodiment of the disclosure may include a plurality of cameras C for photographing traffic information, and a server S for receiving images from the cameras C, storing the images, and providing a tracking service based on the stored images.

The system according to an embodiment of the disclosure may further include a terminal T that requests the tracking service and receives the tracking service.

The cameras C, the server S, and the terminal T may transmit and receive data through a network N.

The cameras C may photograph places where vehicles and/or persons are present, such as roads, sidewalks, parking lots, streets, etc. Two or more cameras C may be installed at different locations. Each camera C may be a pan tilt zoom (PTZ) camera capable of panning, tilting, and zooming. The camera C may transmit a captured image to the server S through the network N.

The server S may receive the image from the camera C, analyze the image, and store the image and the analyzed result. The server S may control the camera C. The server S may provide at least one service to the terminal T, which is a client. For example, the server S may provide an object tracking service to the terminal T.

The terminal T may request the server S to look up stored data. The terminal T may request the server S to look up a stored image. The terminal T may request the server S to track a specific object based on the stored data. The terminal T may transmit information about the specific object to the server S to request the server S to track a travel route of the corresponding object, and receive a tracked route from the server S.

The terminal T may be a personal computer (PC), a smart phone, a tablet computer, a laptop computer, or the like, and may include all kinds of terminals that are capable of accessing a web/mobile site related to the server S and installing and executing a service-dedicated program. A plurality of terminals T may be included in the system.

The network N may include a wired network, such as, for example, local area networks (LANs), wide area networks (WANs), metropolitan area networks (MANs), integrated service digital networks (ISDNs), or the like, and a wireless network, such as wireless LANs, code division multiple access (CDMA), Bluetooth, $3^{rd}$ Generation (3G), $4^{th}$ Generation (4G), 5th Generation (5G), long term evolution (LTE), or the like, although not limited thereto.

Figure 2:
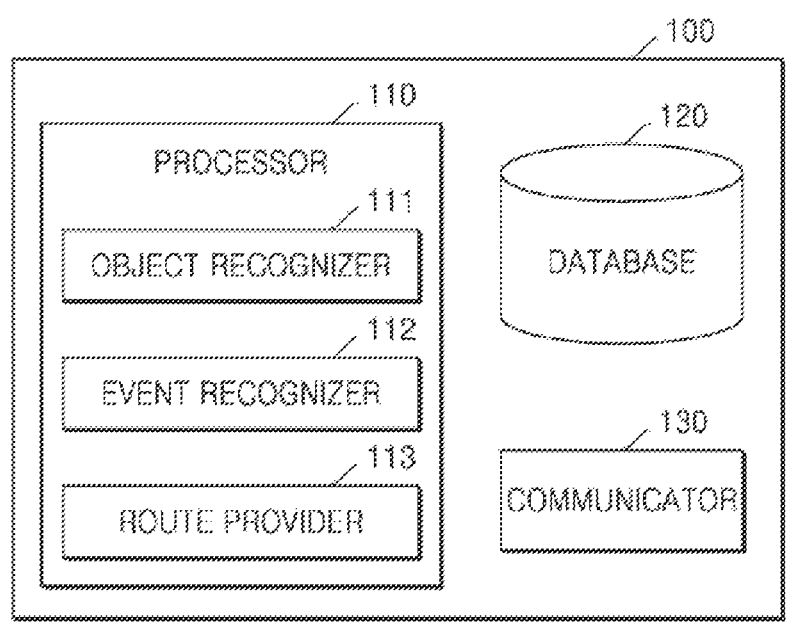
FIG. 2 is a block diagram schematically showing an object tracking device of a traffic information providing apparatus according to an embodiment of the disclosure.

FIG. 2 is a block diagram schematically showing an object tracking device 100 according to an embodiment of the disclosure. The object tracking device 100 may be installed in the server S.

Referring to FIG. 2, the object tracking device 100 may include a processor 110, a database 120, and a communicator 130. In the object tracking device 100 shown in FIG. 2, only components related to the current embodiment are shown to prevent a characteristic of the current embodiment from becoming obscure. Accordingly, it will be understood by one of ordinary skill in the art that other general-purpose components than the components shown in FIG. 2 may be additionally included.

The processor 110 shown in FIG. 2 may correspond to or include at least one processor. Accordingly, the object tracking device 100 may be included in another hardware device, such as a microprocessor or a general-purpose computer system, and driven. The processor 110 may perform data processing required for the embodiments of the disclosure according to execution of a program in a memory (not shown).

The embodiments of the disclosure may be represented by functional block configurations and various processing operations of the processor 110. Functional aspects may be implemented as algorithms that are executed by one or more processors.

The processor 110 may include an object recognizer 111, an event recognizer 112, and a route provider 113.

The database 120 may store images received from the camera C or image information analyzed by the processor 110.

The communicator 130 may transmit and receive data to and from the camera C and/or the terminal T. The communicator 130 may receive an image from the camera C, receive an object tracking request from the terminal T, and provide a result of object tracking to the terminal T.

According to an embodiment, the communicator 130 may receive images from the plurality of cameras C that photograph traffic information. Alternatively, the communicator 130 may receive images captured by the plurality of cameras C that photograph traffic information, from another server. According to an embodiment, the object recognizer 111 may recognize at least one of a person and a vehicle from a frame included in an image. The object recognizer 111 may generate an object tag for the frame. The object tag may be a tag for a person or a tag for a vehicle, and may include identification information for identifying an object. For example, information for identifying a person may include face recognition information, a height, information about whether glasses are present, gender information, silhouette information, biometric information, or personal information (for example, a resident registration number or a cell phone number), and information for identifying a vehicle may include at least one of a license plate number, a model, a color, and a vehicle registration number. The identification information may be acquired from an image by the object recognizer 111.

According to an embodiment, the object recognizer 111 may perform object recognition and tag generation on all frames included in an image.

According to an embodiment, the object recognizer 111 may sample frames included in an image at a sampling interval N of N frames, determine whether at least one of a person and a vehicle is present for each of the sampled frames, and generate an object tag for each of the sampled frames according to the determined result. The sampling interval N may be set by a manager, or appropriately set considering the performance of the processor 110 and a frame rate of the image. For example, the sampling interval N may be set to the frame rate so that a time interval of the sampled frames becomes 1 second.

The event recognizer 112 may generate a getting-in event and/or a getting-off event with reference to the object tag generated by the object recognizer 111. More specifically, when a vehicle and a person within a predetermined distance from the vehicle are recognized from a first frame, and the vehicle is recognized while the person is not recognized from a second frame following the first frame, the event recognizer 112 may determine that the person has gotten into the vehicle, and generate a getting-in event tag including information about the vehicle and information about the person for the second frame.

When a vehicle is recognized while no person is recognized from a third frame and the vehicle and a person within a predetermined distance from the vehicle are recognized from a fourth frame following the third frame, the event recognizer 112 may determine that the person has gotten off the vehicle, in the fourth frame, and accordingly, the event recognizer 112 may generate a getting-off event tag for the fourth frame. The getting-off event tag may include information about the person who has gotten off and information about the vehicle which the person has gotten off.

As described above, the object recognizer 111 may sample an image into a plurality of sampled frames, and the event recognizer 112 may also generate a tag of at least one of a getting-in event and a getting-off event for the plurality of sampled frames with reference to object tags generated for the plurality of sampled frames. In this case, the first frame and the second frame as described above may be successive frames of the plurality of sampled frames, and the third frame and the fourth frame may be successive frames of the plurality of sampled frames.

The object recognizer 111 according to an embodiment may generate a record for each of a plurality of frames (or each sampled frame) included in an image, and store the record in the database 120. The record may include an object tag recognized from the frame. The object tag may include object identification information.

The event recognizer 112 according to an embodiment may generate an event tag described above with reference to the object tag of the record stored in the database 120, include the generated event tag in a record of a frame corresponding to the event tag, and store the record in the database 120.

In the above-described embodiments, because an object tag is generated only when an object exists for each frame and an event tag is generated only when an event occurs, there may be a frame including neither an object tag nor an event tag, a frame including only an object tag, a frame including only an event tag, and a frame including both an object tag and an event tag.

According to an embodiment, the communicator 130 may receive a request for a travel route of a first vehicle from the terminal T. The route provider 113 may track a travel route of the first vehicle in the database 120, and the travel route tracked by the route provider 113 may be provided to the terminal T by the communicator 130.

More specifically, the route provider 113 may search for a plurality of records stored in the database 120 in chronological order and provide route information including at least one of an image and photographing location information corresponding to a continuous first record section including an object tag corresponding to information about the first vehicle, a second record including a getting-off event tag and the object tag corresponding to the information about the first vehicle, and a continuous third record section following the second record and including an object tag corresponding to information about a first person included in the getting-off event tag of the second record.

When a request for a travel route of a person is received from the terminal T, the route provider 113 may provide a travel route of the person by replacing the person with a vehicle and the vehicle with a person in the above-described embodiment.

For example, the communicator 130 may receive a request for a travel route of the first person from the terminal T. In this case, the route provider 113 may search for a plurality of records stored in the database 120 in chronological order and provide route information including at least one of an image and photographing location information corresponding to a continuous first record section including an object tag corresponding to information about the first person, a second record including a getting-in event tag and the object tag corresponding to the information about the first person, and a continuous third record section following the second record and including an object tag corresponding to information about a second vehicle included in the getting-in event tag of the second record.

FIG. 3 shows an example of a table stored in the database 120 according to an embodiment of the disclosure.

Each of records 31 to 36 shown in FIG. 3 may correspond to a frame. Referring to FIG. 3, each of the records 31 to 36 may include data for a plurality of columns. Each column may include channel number No., time, and tag information. Referring to the record 31, a frame corresponding to the record 31 may have been photographed at 01:01:01 by a camera corresponding to channel 1, and a person "A" may be recognized from the corresponding frame by the object recognizer 111, which represents that person information has been tagged. Referring to the record 35, a frame corresponding to the record 35 may have been photographed at 01:05:03 by a camera corresponding to channel 2, and the person "A" and a vehicle "B" may be recognized from the corresponding frame by the object recognizer 111, which represents that person information and vehicle information have been tagged.

Channel numbers of cameras may be replaced by location information (coordinates, addresses, etc.) of the cameras. Alternatively, the location information of the cameras corresponding to the channel numbers of the cameras may be stored together with the channel numbers of the cameras in the database 120, or may be set to be looked up by the server S.

Meanwhile, the table shown in FIG. 3 may be a table stored in the database 120 which stores object tags for a vehicle and person of each frame, recognized and generated by the object recognizer 111.

FIG. 4 shows another example of a table stored in the database 120 according to an embodiment of the disclosure.

The table shown in FIG. 4 may be a table obtained by adding a tag of an event recognized by the event recognizer 112 with reference to the table shown in FIG. 3 to each record.

Referring to FIG. 4, the event recognizer 112 may refer to records stored in the database 120 in chronological order, and, when the event recognizer 112 determines that the record 32 in which both the person "A" and the vehicle "B" are tagged and the record 33 in which only the vehicle "B" is tagged are successive, the event recognizer 112 may determine that the person "A" has gotten in the vehicle "B", and add a getting-in event tag to the record 33. The getting-in event tag added to the record 33 may include identification information of "A" as information about a person which has gotten in a vehicle, and identification information of "B" as information about a vehicle which "A" has gotten in.

According to an embodiment, a person tag and a vehicle tag may include information about locations at which the corresponding objects have been recognized. In the current embodiment, the event recognizer 112 may determine a condition of whether a distance between a person and a vehicle is shorter than a predetermined distance in a frame corresponding to the record 32 to recognize a getting-in event, and when the condition is satisfied, the event recognizer 112 may generate and store a getting-in event tag. The predetermined distance may be set according to a sampling interval of frames. As the sampling interval of frames is longer, the predetermined distance may be set to a longer distance.

The event recognizer 112 may refer to the records stored in the database 120 in chronological order, and, when the event recognizer 112 determines that the record 34 in which the vehicle "B" is tagged and the record 35 in which the person "A" is tagged are successive in this order, the event recognizer 112 may determine that the person "A" has gotten off the vehicle "B", and add a getting-off event tag to the record 35. The getting-off event tag added to the record 35 may include identification information of "A" as information about a person which has gotten off, and identification information of "B" as information about a vehicle which "A" has gotten off.

As described above, the event recognizer 112 may determine a condition of whether a distance between a person and a vehicle is shorter than a predetermined distance in a frame corresponding to the record 35 to recognize a getting-off event, and, when the condition is satisfied, the event recognizer 112 may generate and store a getting-off event tag. The predetermined distance may be set according to a sampling interval of frames. As the sampling interval of frames is longer, the predetermined distance may be set to a longer distance.

In FIG. 4, an example in which a tag for a person and a tag for a vehicle are displayed is shown. However, the example is to describe an embodiment of the disclosure, and the disclosure is not limited to the example. For example, when persons "A" and "C" are tagged in the record 32 and the person "C" is tagged in the record 33, the event recognizer 112 may generate and store a getting-in event because the event recognizer 117 determines that the person "A" is located around the vehicle "B" from the record 32 and the person "A" is not tagged in the record 33 following the record 32.

When a plurality of vehicles are tagged in the records 32 and 33, the event recognizer 112 may generate a getting-in event for the record 33 such that the record 32 includes vehicle information recognized at a location that is closest to the person "A". When a plurality of vehicles are tagged in the records 34 and 35, the event recognizer 112 may generate a getting-off event for the record 35 such that the record 35 includes vehicle information recognized at a location that is closest to the person "A".

Figure 5:
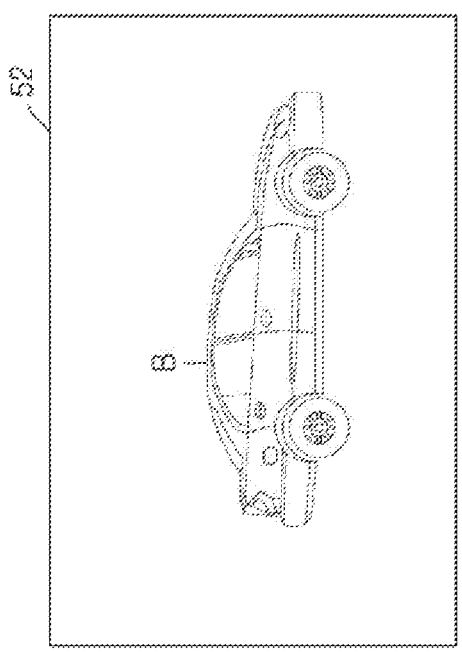
FIG. 5 shows an example of a frame in which a getting-in event occurs.
Figure 5:
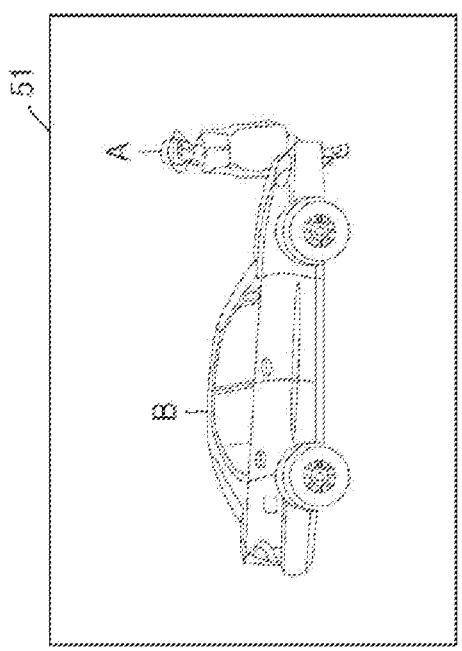

FIG. 5 shows an example of a frame in which a getting-in event occurs.

In FIG. 5, a first frame 51 may correspond to the record 32 of FIG. 4, and a second frame 52 may correspond to the record 33 of FIG. 4.

Referring to FIG. 5, when the person "A" is not recognized from the second frame 52 following the first frame 51 from which the person "A" and the vehicle "B" are recognized, and the person "A" and the vehicle "B" are recognized within a predetermined distance from the first frame 51, a getting-in event tag for the person "A" and the vehicle "B" may be generated for the second frame 52.

Figure 6:
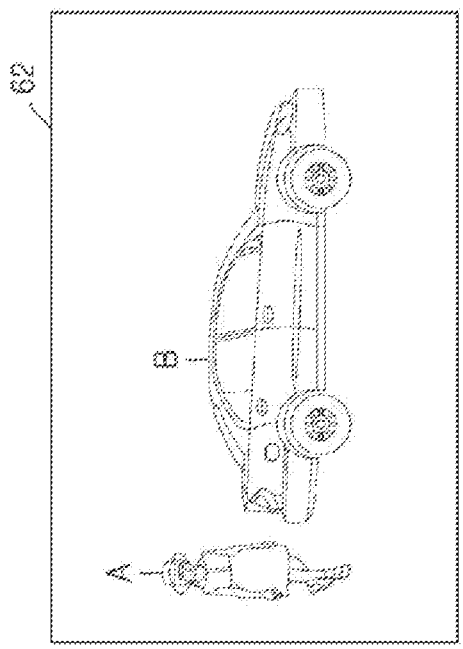
FIG. 6 shows an example of a frame in which a getting-off event occurs.
Figure 6:
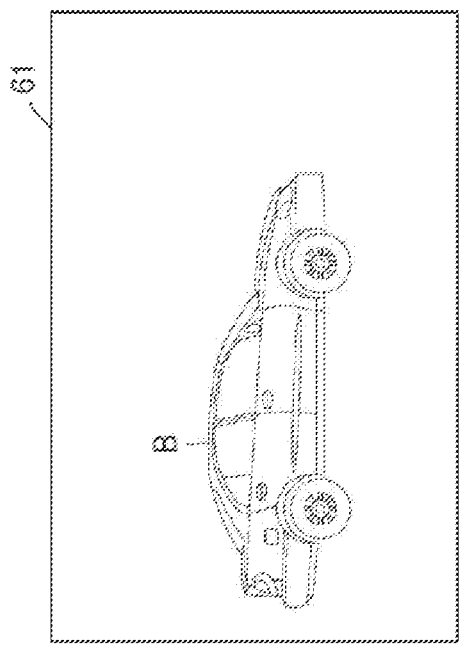

FIG. 6 shows an example of a frame in which a getting-off event occurs.

In FIG. 6, a third frame 61 may correspond to the record 34 of FIG. 4, and a fourth frame 62 may correspond to record 35 of FIG. 4.

Referring to FIG. 6, when the person "A" is not recognized and the vehicle "B" is recognized from the third frame 61, and the person "A" and the vehicle "B" are recognized within a predetermined distance from the fourth frame 62 following the third frame 61, a getting-off event tag for the person "A" and the vehicle "B" may be generated for the fourth frame 62.

FIG. 7 shows another example of a table stored in the database 120, according to an embodiment of the disclosure. Referring to FIG. 7, a plurality of records 71 to 77 are shown, and the records 71 to 77 may correspond to successive frames.

Referring to FIG. 7, the event recognizer 112 may perform validation to generate a getting-in event. For example, before a getting-in event tag for a record 73 is added according to a getting-in event generation condition as described above, the event recognizer 112 may perform validation for determining whether the person "A" included in the getting-in event is not recognized from m records following the record 73 to which the getting-in event tag is to be added. That is, when the vehicle "B" is recognized and the person "A" is recognized within a predetermined distance from the vehicle "B" from a first frame corresponding to the record 72, the vehicle "B" is recognized and the person "A" is not recognized from a second frame corresponding to the record 73, and the person "A" is not recognized from m records 74, . . . following the record 73, the event recognizer 112 may add a getting-in event tag including information about the vehicle "B" and the person "A" to the record 73 and store the record 73.

According to an embodiment, the event recognizer 112 may additionally determine whether the person "A" is not recognized from m records after a photographed time 01:01:03 of the record 73, in a channel (for example, channel 2 being adjacent to channel 1 being a channel of the record 73) being adjacent to the record 73 to which a getting-in event tag is to be added for validation. When the person "A" is not recognized in the adjacent channel, the event recognizer 112 may add a getting-in event tag including information about the vehicle "B" and the person "A" to the record 73, and store the record 73.

According to an embodiment, when the person "A" gets out of a photographing area of the channel 1 to disappear from an image and then again appears in a photographing area of the channel 2, no getting-in event may be generated in the record 73. Therefore, when the person "A" is present around the vehicle "B" and then moves to get out of the photographing area of the channel 1 to disappear accidently from around the vehicle B, wrong recognition of determining that the person "A" has gotten in the vehicle "B" may be prevented.

FIG. 8 shows another example of a table stored in the database 120, according to an embodiment of the disclosure. Referring to FIG. 8, a plurality of records 81 to 87 are shown, and the records 81 to 87 may correspond to frames.

Referring to FIG. 8, the event recognizer 112 may perform validation to generate a getting-off event. For example, before a getting-off event tag for a record 82 is added according to a getting-off event generation condition as described above, the event recognizer 112 may perform validation for determining whether the person "A" included in the getting-off event is continuously recognized from m records following the record 82 to which the getting-off event tag is to be added. That is, when the vehicle "B" is recognized from a third frame corresponding to the record 81, the vehicle "B" and the person "A" within a predetermined distance from the vehicle "B" are recognized from a fourth frame corresponding to the record 82, and the person "A" is continuously recognized from m records 83, . . . following the record 82, the event recognizer 112 may add a getting-off event tag including information about the vehicle "B" and the person "A" to the record 82 and store the record 82.

Figure 9:
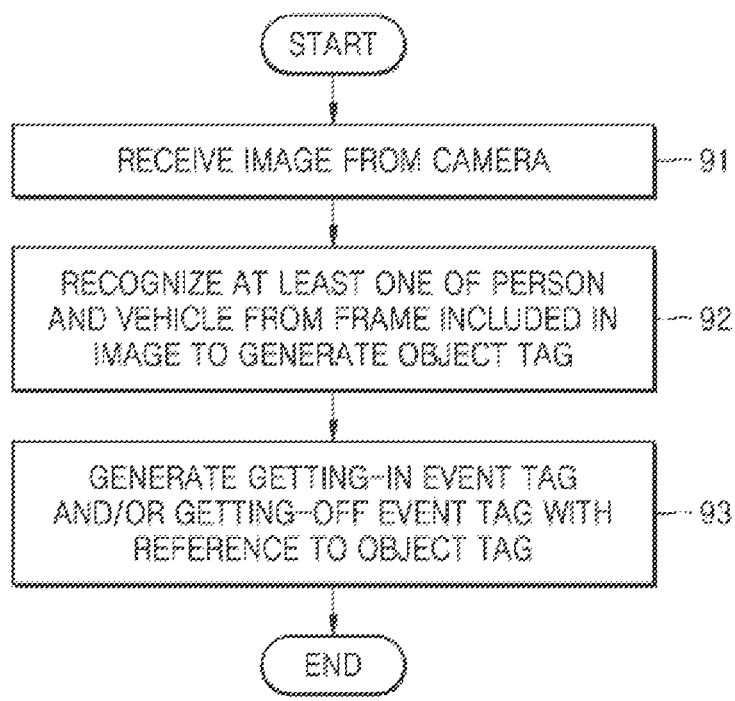
FIG. 9 is a flowchart showing a traffic information processing method according to an embodiment of the disclosure.

FIG. 9 is a flowchart showing a traffic information processing method according to an embodiment of the disclosure. The flowchart shown in FIG. 9 may be configured with operations that are processed time-sequentially by the system shown in FIG. 1 and the object tracking device 100 shown in FIG. 2. Therefore, all descriptions given above with reference to the configuration shown in FIG. 2 may be applied to the flowchart shown in FIG. 9, although some of the descriptions are omitted below.

Referring to FIG. 9, in operation 91, the communicator 130 may receive an image from a camera C. Or, in operation 91, the communicator 130 may receive an image captured by the camera C from another server.

In operation 92, the object recognizer 111 may recognize at least one of a person and a vehicle from a frame included in the image to generate an object tag. The object recognizer 111 may store the generated object tag in the database 120.

In operation 93, the event recognizer 112 may generate a getting-in event tag and/or a getting-off event tag, with reference to the object tag generated in operation 92. The event recognizer 112 may store the getting-in event tag and/or the getting-off event tag in the database 120.

According to an embodiment of the disclosure, the traffic information processing method shown in FIG. 9 may be designed to be performed by the camera C. For example, in operation 91, the camera C may capture an image, and in operations 92 and 93, the camera C may itself analyze the captured image and generate an object tag and an event tag, and directly store the generated tags in the database 120 of the server S or transmit the tags to the server S to store the tags in the database 120. The modifications of the embodiments may be designed according to computing performance of a data processor included in the camera C. That is, when the computing performance of the data processor included in the camera C is high, a tag generation operation may be processed by the camera C, and, otherwise, the tag generation operation may be processed by the server S.

According to an embodiment of the disclosure, records stored in the database 120 by the method of FIG. 9 may be collated regularly or irregularly to be backed up in a separate central database (not shown).

Figure 10:
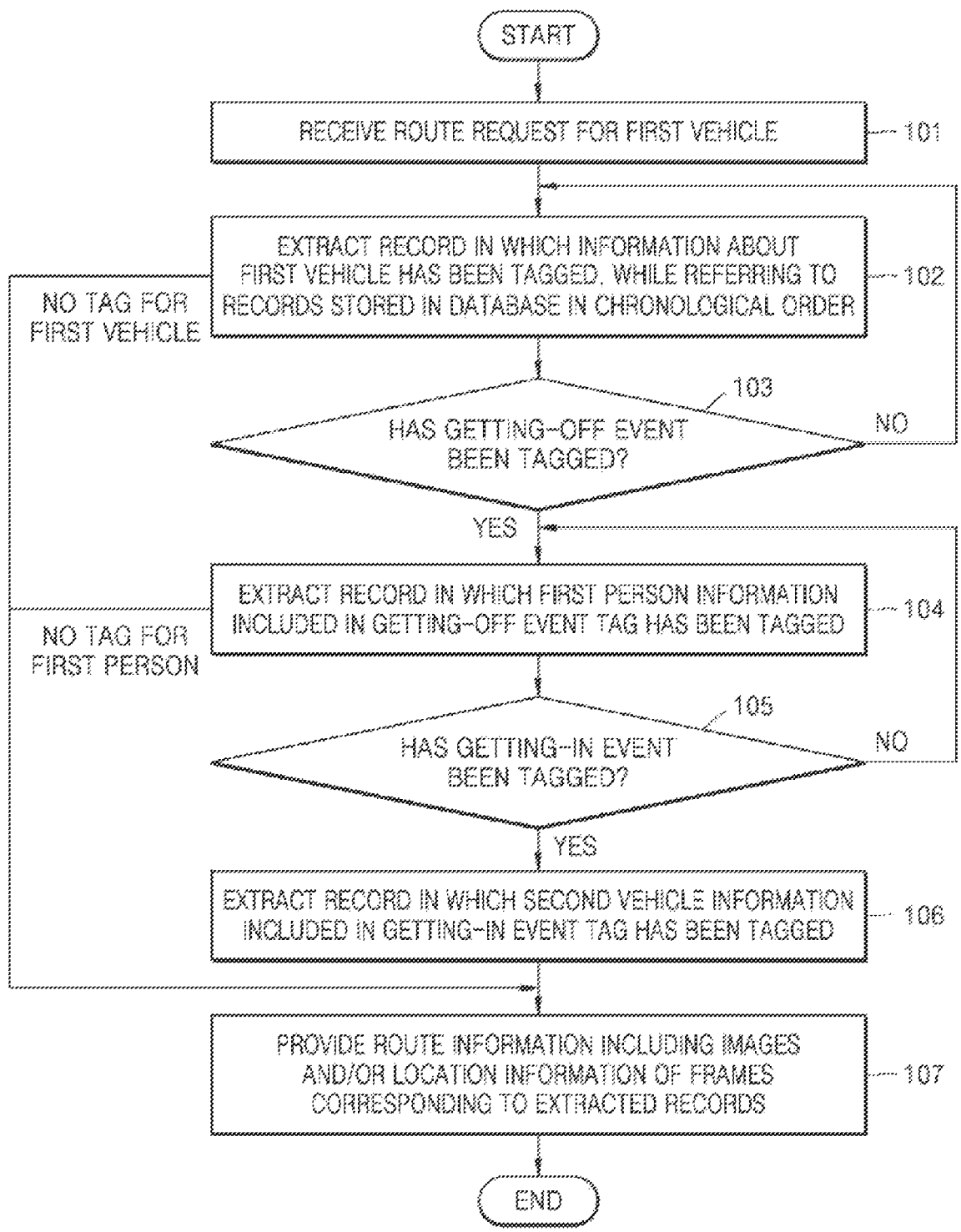
FIG. 10 is a flowchart showing an object tracking method according to an embodiment of the disclosure.

FIG. 10 is a flowchart showing an object tracking method according to an embodiment of the disclosure. Because the flowchart shown in FIG. 10 is configured with operations that are processed time-sequentially by the object tracking device 100 shown in FIG. 2, all the descriptions given above with reference to the configuration shown in FIG. 2 may be applied to the flowchart shown in FIG. 10, although some of the descriptions are omitted below.

Referring to FIG. 10, in operation 101, the communicator 130 may receive a request for tracking a route of the first vehicle from the terminal T.

In operation 102, the route provider 113 may extract a record including an object tag corresponding to information about the first vehicle, while referring to records stored in the database 120 in chronological order. Whenever a record in which the information about the first vehicle is tagged is extracted, the route provider 113 may determine whether a getting-off event for the first vehicle has been tagged in the record, in operation 103. When the getting-off event has been tagged in the record, the process may proceed to operation 104, and, when no getting-off event has been tagged in the record, the process may proceed to operation 102 to extract the next record. When operation 102 is repeatedly processed, a continuous first record section including the object tag corresponding to the information about the first vehicle may be extracted.

When an object tag corresponding to the information about the first vehicle is no longer found, the process may proceed to operation 107 from operation 102.

In operation 103, a second record in which a getting-off event is tagged may be extracted.

In operation 104, tracking may continue to be performed by using information about a first person included in the getting-off event tag. That is, the route tracking request from the terminal T relates to the first vehicle, however, according to an embodiment of the disclosure, the first person that has gotten off the first vehicle may continue to be tracked. In operation 104, the route provider 113 may extract a record including the object tag corresponding to the information about the first person, while continuously referring to the records in chronological order. Whenever a record in which the information about the first person is tagged is extracted, the route provider 113 may determine whether a getting-in event for the first person has been tagged in the record, in operation 105. When the getting-in event for the first person has been tagged in the record, the process may proceed to operation 106, and otherwise, the process may again proceed to operation 104 to extract the next record. When operation 104 is repeatedly processed, a continuous third record section including the object tag corresponding to the information about the first person may be extracted.

When an object tag corresponding to the information about the first person is no longer found, the process may proceed to operation 107 from operation 104.

In operation 105, a fourth record in which a getting-in event has been tagged may be extracted.

When the process proceeds to operation 106, a record in which second vehicle information included in the getting-in event tag of operation 105 has been tagged may be extracted.

In FIG. 10, operations 101 to 107 are shown, however, the disclosure is not limited to the flowchart shown in FIG. 10. For example, operation 106 may be repeatedly performed until a getting-off event is tagged or until a record in which information about the second vehicle has not been tagged is found, as described above with reference to operation 102. Accordingly, a continuous fifth record section may be extracted.

When tracking is completed, the route provider 113 may provide route information including images and/or location information of frames corresponding to extracted records, in operation 107. The route provider 113 may acquire, as the tracked result, two or more successive records from among the first record section extracted in operation 102, the second record extracted in operation 103, the third record section extracted in operation 104, the fourth record extracted in operation 105, and the fifth record section extracted in operation 106, and continuously list images of frames corresponding to the records acquired as the tracked result to provide the images to the terminal T, or continuously list location information of the frames corresponding to the records acquired as the tracked result to provide the location information to the terminal T. The location information of the frames may be acquired from channel information of a camera that has photographed the frames.

The method according to an embodiment of the disclosure shown in FIGS. 9 and 10 may be written in the form of a program that is executable on a computer, and may be implemented in a general-purpose digital computer operating the program by using a computer-readable recording medium. Examples of the computer-readable recording medium may include storage media such as magnetic storage media (for example, ROMs, floppy disks, hard disks, etc.), and optical recording media (for example, CD-ROMs, DVDs, etc.).

According to an embodiment, some of operations shown in FIG. 10 may be performed. For example, in operation 101, when a request for a route of the first vehicle is received so that the process proceeds to operation 102, records in which information about the first vehicle has been tagged may be extracted in chronological order, and whether the process proceeds to operation 104 may be determined according to a condition of operation 103. Because no getting-off event has been tagged in the records extracted in operation 102, the process may fail to proceed to operation 104 and operation 102 may be repeatedly performed. At this time, a record without a tag of the first vehicle may be found. In this case, the process may proceed to operation 107. That is, in the current embodiment, only operations 101, 102, and 107 may be performed. According to another embodiment, only operations 101 to 105 and 107 may be performed.

When a route of the first person is requested from the terminal T in operation 101, a flowchart resulting from replacing the person with a vehicle in operations shown in FIG. 10 may be applied.

When records stored in the database 120 are collated regularly or irregularly to be backed up in a separate central database (not shown) according to an embodiment of the disclosure, the route provider 113 may generate and provide a route with reference to the central database in the method shown in FIG. 10.

The disclosure may be applied to a traffic information providing system. For example, the disclosure may be applied to a system for tracking a suspect or a suspected vehicle. The disclosure may be applied to image processing technology for tagging images to create database.

While the disclosure has been shown and described with reference to the embodiments thereof, it will be understood by those of ordinary skill in the art that various changes in form and details may be made therein without departing from the spirit and scope of the disclosure as defined by the appended claims and their equivalents.

What is claimed is:

1. An object tracking method, comprising:
generating an object tag for frames included in images captured by at least one camera photographing a traffic information, by recognizing at least one of a person and a vehicle from the frames; and
generating an event tag referring to the object tag, the event tag comprising a getting-in event tag and a getting-off event tag,
wherein the getting-in event tag is generated, when a vehicle and a person within a predetermined distance from the vehicle are recognized from a first frame, and the vehicle is recognized while the person is not recognized from a second frame following the first frame, and
wherein the getting-off event tag is generated, when a vehicle is recognized while no person is recognized from a third frame and the vehicle and a person within the predetermined distance from the vehicle are recognized from a fourth frame following the third frame.

2. The object tracking method of claim 1,
wherein the generating the object tag comprises sampling the image into a plurality of sampled frames at an interval N of N frames, determining whether at least one of a person and a vehicle is present for each of the plurality of sampled frames, and generating a plurality of object tags for the plurality of sampled frames, respectively, according to the determined result, and
wherein generating the event tag comprises generating a tag of at least one of the getting-in event and the getting-off event with reference to the plurality of object tags generated for the plurality of sampled frames, wherein the first frame and the second frame are successive in the plurality of sampled frames, and the third frame and the fourth frame are successive in the plurality of sampled frames.

3. The object tracking method of claim 1,
wherein the generating the object tag comprises generating a plurality of object tags for each of a plurality of frames included in the images.

4. The object tracking method of claim 1, further comprising:
generating a record for each of the frames included in the images, the record comprising the object tag;

generating the event tag with reference to the object tag of the record; and storing the event tag in a record of a frame corresponding to the event tag.

5. The object tracking method of claim 1, further comprising:

receiving a request for a travel route of a first vehicle from a terminal;

searching for records in chronological order in a database storing a plurality of records; and providing route information including at least one of an image and photographing location information corresponding to a continuous first record section including an object tag corresponding to information about the first vehicle, a second record including the object tag corresponding to the information about the first vehicle and a getting-off event tag, and a continuous third record section following the second record and including an object tag corresponding to information about a first person included in the getting-off event tag of the second record.

6. The object tracking method of claim 1, further comprising:

receiving a request for a travel route of a first person from a terminal;

searching for records in chronological order in a database storing a plurality of records; and providing route information including at least one of an image and photographing location information corresponding to a continuous first record section including an object tag corresponding to information about the first person, a second record including the object tag corresponding to the information about the first person and a getting-in event tag, and a continuous third record section following the second record and including an object tag corresponding to information about a second vehicle included in the getting-in event tag of the second record.

7. An object tracking apparatus, comprising:

an object recognizer configured to recognize at least one of a person and a vehicle from frames included in images captured by at least one camera photographing a traffic information and generate an object tag for the frames; and an event recognizer configured to generate an event tag referring to the object tag, the event tag comprising a getting-in event tag and a getting-off event tag, wherein the getting-in event tag is generated, when a vehicle and a person within a predetermined distance from the vehicle are recognized from a first frame, and the vehicle is recognized while the person is not recognized from a second frame following the first frame, and wherein the getting-off event tag is generated, when a vehicle is recognized while no person is recognized from a third frame and the vehicle and a person within the predetermined distance from the vehicle are recognized from a fourth frame following the third frame.

8. The object tracking method of claim 7, wherein the object recognizer is configured to sample the image into a plurality of sampled frames at an interval N of N frames, determine whether at least one of a person and a vehicle is present for each of the plurality of sampled frames, and generate a plurality of object tags for the plurality of sampled frames, respectively, according to the determined result, and wherein the event recognizer configured to generate a tag of at least one of the getting-in event and the getting-off event with reference to the plurality of object tags generated for the plurality of sampled frames, wherein the first frame and the second frame are successive in the plurality of sampled frames, and the third frame and the fourth frame are successive in the plurality of sampled frames.

9. The object tracking method of claim 7, wherein the object recognizer is configured to generate a plurality of object tags for each of a plurality of frames included in the images.

10. The object tracking method of claim 7, wherein the object recognizer is further configured to generate a record for each of the frames included in the images, the record comprising the object tag;

wherein the event recognizer configured to generate the event tag with reference to the object tag of the record, and store the event tag in a record of a frame corresponding to the event tag.

11. The object tracking method of claim 7, further comprising:

a communicator configured to receive a request for a travel route of a first vehicle from a terminal;

a route provider configured to search for records in chronological order in a database storing a plurality of records, and provide route information including at least one of an image and photographing location information corresponding to a continuous first record section including an object tag corresponding to information about the first vehicle, a second record including the object tag corresponding to the information about the first vehicle and a getting-off event tag, and a continuous third record section following the second record and including an object tag corresponding to information about a first person included in the getting-off event tag of the second record.

12. The object tracking method of claim 7, further comprising:

a communicator configured to receive a request for a travel route of a first person from a terminal;

a route provider configured to search for records in chronological order in a database storing a plurality of records; and provide route information including at least one of an image and photographing location information corresponding to a continuous first record section including an object tag corresponding to information about the first person, a second record including the object tag corresponding to the information about the first person and a getting-in event tag, and a continuous third record section following the second record and including an object tag corresponding to information about a second vehicle included in the getting-in event tag of the second record.

* * * * *